(12) United States Patent
Shih

(10) Patent No.: US 8,724,319 B2
(45) Date of Patent: May 13, 2014

(54) ELECTRONIC DEVICE AND STAND STRUCTURE THEREOF

(75) Inventor: Jhe-Wei Shih, New Taipei (TW)

(73) Assignee: Amtran Technology Co., Ltd, New Taipei (TW)

( * ) Notice: Subject to any disclaimer, the term of this patent is extended or adjusted under 35 U.S.C. 154(b) by 118 days.

(21) Appl. No.: 13/445,306

(22) Filed: Apr. 12, 2012

(65) Prior Publication Data

US 2013/0163152 A1 Jun. 27, 2013

(30) Foreign Application Priority Data

Dec. 23, 2011 (TW) .............................. 100148460 A

(51) Int. Cl.
*H05K 5/00* (2006.01)
*H05K 7/00* (2006.01)
*G06F 1/16* (2006.01)

(52) U.S. Cl.
CPC .................................. *G06F 1/1601* (2013.01)
USPC .............. 361/679.59; 361/679.05; 361/679.3; 361/679.56

(58) Field of Classification Search
CPC ... G06F 1/1601; G06F 1/1626; G06F 1/1633; G06F 1/1675; G06F 1/1679; G02F 1/1306; G02F 1/133; G02F 1/133308; G02F 1/153; G02F 1/1533; G02F 2001/133317

USPC ................ 361/679.05, 679.3, 679.56, 679.59
See application file for complete search history.

(56) References Cited

U.S. PATENT DOCUMENTS

| | | | |
|---|---|---|---|
| 6,053,589 A * | 4/2000 | Lin | 312/271 |
| 6,570,627 B1 * | 5/2003 | Chang | 348/794 |
| 7,566,043 B2 * | 7/2009 | Chen | 248/616 |
| 7,810,768 B2 | 10/2010 | Wang et al. | |
| 8,498,101 B2 * | 7/2013 | Chiang et al. | 361/679.22 |
| 2002/0139909 A1 * | 10/2002 | Oyama et al. | 248/188.8 |

* cited by examiner

*Primary Examiner* — Anthony Haughton
(74) *Attorney, Agent, or Firm* — Morris Manning & Martin LLP; Tim Tingkang Xia, Esq.

(57) ABSTRACT

A stand structure comprises a principal member, a supporting member and an elastic member. The principal member is configured to connect with an object. The supporting member is movably connected with the principal member. Two opposite terminals of the elastic member are fixed at the principal member and the supporting member respectively. When the object is tilted at a tilt angle relative to a bearing surface, the supporting member is retracted and displaced relative to the principal member, and therefore the elastic member is elastically deformed to generate a supporting force to withstand the weight of the object so that the tilt angle of the object can be maintained.

18 Claims, 6 Drawing Sheets

ELECTRONIC DEVICE AND STAND STRUCTURE THEREOF

CROSS-REFERENCE TO RELATED APPLICATIONS

This non-provisional application claims priority under 35 U.S.C. §119(a) on Patent Application No(s). 100148460 filed in Taiwan, R.O.C. on Dec. 23, 2011, the entire contents of which are hereby incorporated by reference.

BACKGROUND

1. Technical Field

The present disclosure relates to a stand structure and more particularly to a stand structure which is configured to adjust the viewing angle of a monitor.

2. Related Art

Since the invention of television, it has been a media for users to view and enjoy different interesting things in the world at home in order to be entertained and educated. Television has evolved from the conventional cathode ray tube (CRT) in the early stage into the modern and advanced liquid crystal display (LCD) and plasma display panel (PDP). In other words, the bulky cathode ray tube has been replaced with the lighter and slimmer liquid crystal display and plasma display panel. As a result, a compact display can be installed in a smaller space, so that the oppressive feeling of space is transformed into a comfortable feeling. Furthermore, because computer products have evolved to be more compact and light, tablet computer with slim display is more convenient to be carried around and users can enjoy the multimedia experiences via tablet computer anytime and anywhere.

A slim display is usually assembled on a base to be supported by it so that the display can be positioned on a desk securely. The angle of a shaft of the base or the length of a stand has to be adjusted in order to adjust a viewing angle of the slim display required by the user.

However, the base is bulky and much space is occupied by it, which makes it inconvenient for the display to be stored or carried around, and furthermore, the cost for packaging and transporting the display is more expensive for manufacturers. Therefore, a structure and design different from the conventional base is provided by the disclosure to meet the requirements of both manufacturers and users.

SUMMARY

The present invention provides an electronic device and stand structure thereof, so as to adjust the viewing angle of a monitor easily without stand provided.

In one aspect, the stand structure according to the invention comprises a principal member, a supporting member and an elastic member. The principal member has a connecting terminal which is configured to connect with an object. The supporting member is connected to the principal member in a retractable manner, wherein the supporting member has a withstanding terminal for leaning against a bearing surface. Two opposite terminals of the elastic member are fixed at the principal member and the supporting member respectively. When the object is tilted at a title angle relative to the bearing surface, the supporting member is retracted and displaced relative to the principal member, and therefore the elastic member is elastically deformed to generate an opposite supporting force to withstand the object so that the tilted angle of the object is maintained.

In another aspect, the electronic device according to the invention comprises a main body and a stand structure. The stand structure comprises a principal member, a supporting member and an elastic member. The principal member has a connecting terminal which is connected to a side of the main body. The supporting member is connected to the principal member in a retractable manner, wherein the supporting member has a withstanding terminal supporting for leaning against a bearing surface. Two opposite terminals of the elastic member are fixed at the principal member and the supporting member respectively. When the main body is tilted at an angle relative to the bearing surface, the supporting member is retracted and displaced relative to the principal member, and therefore the elastic member is elastically deformed to generate an opposite supporting force to withstand the main body so that the tilted angle of the main body can be maintained.

In the stand structure provided in the invention, when the main body (object) is title, the elastic member generates a corresponding elasticity, and thus the main body is capable of being maintained at such tilted angle. Using the stand structure provided in the present disclosure, when the title angle of the main body (object) is to be adjusted to a desirable angle according to a user's need, the user could simply push the main body (object), and there is no need to adjust the stand structure manually.

The characteristics, the applications and the effects according to the embodiments of the present disclosure will be described in detail with reference to the accompanying drawings.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
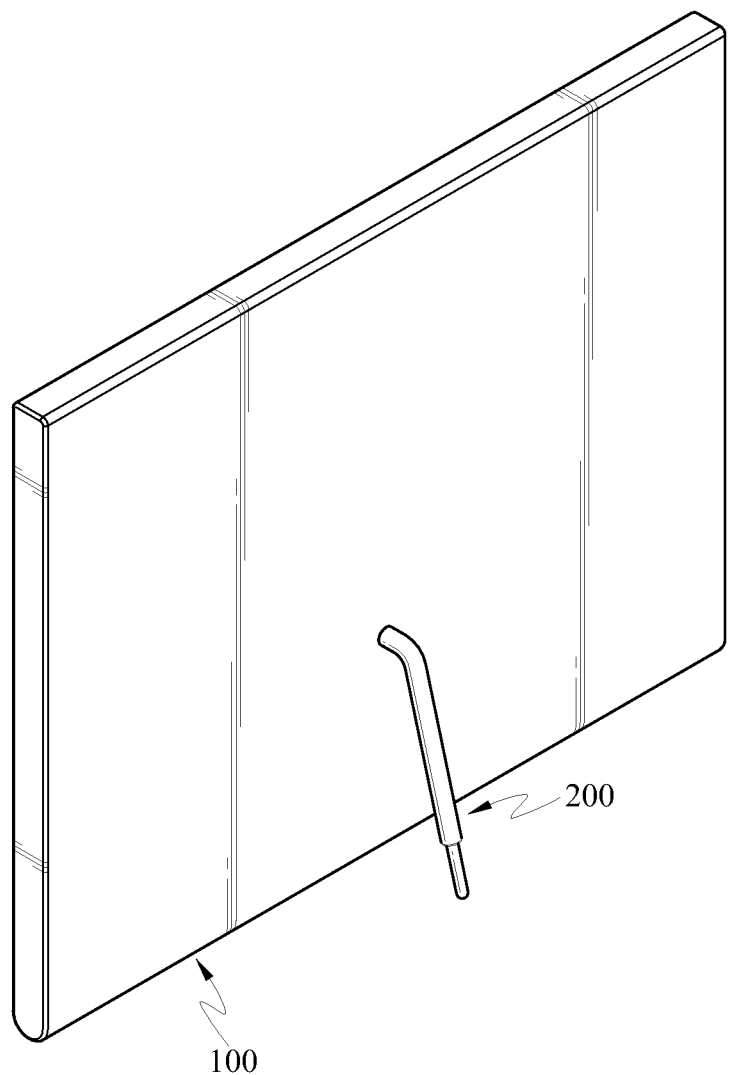
FIG. 1 is a perspective view of an electronic device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
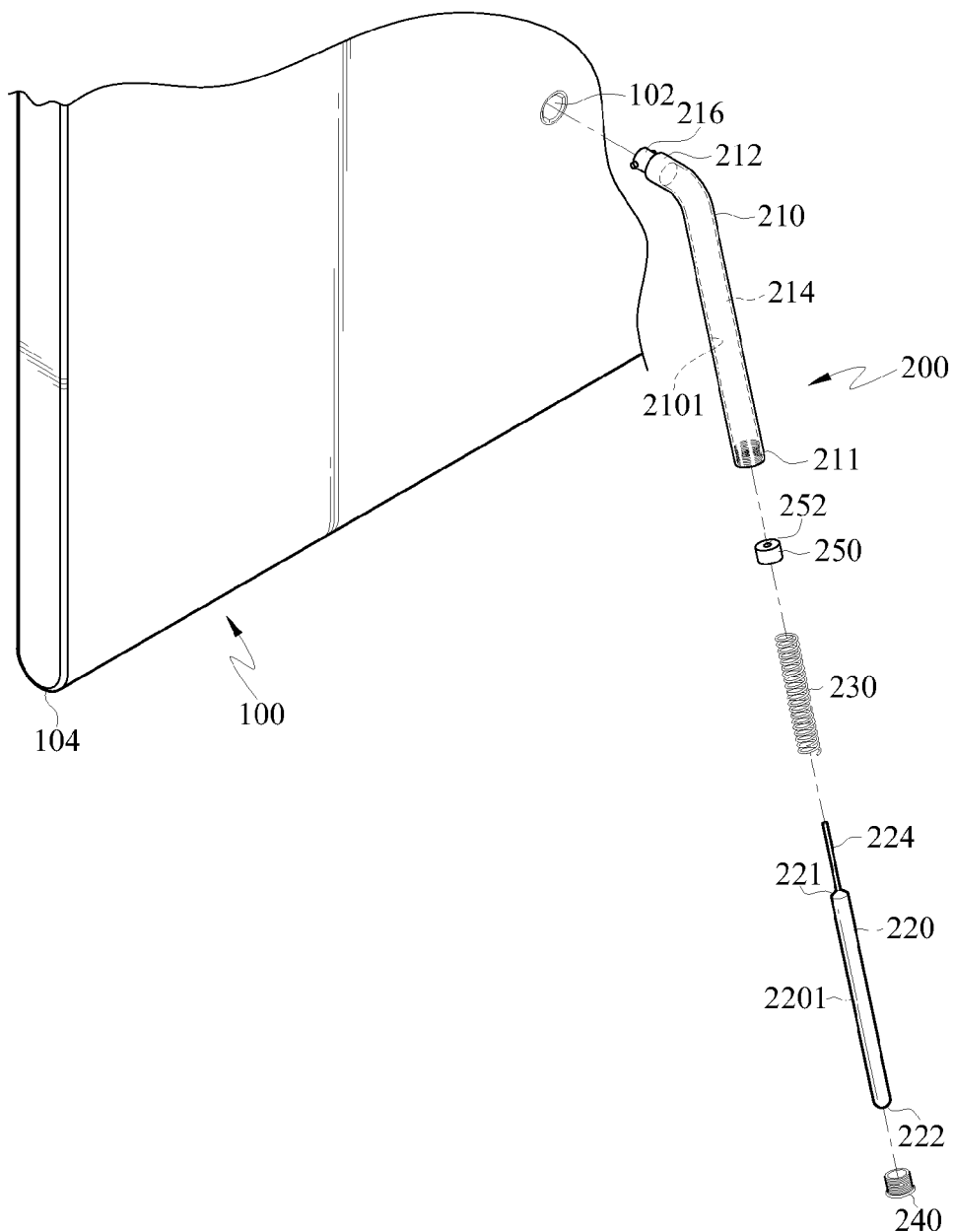
FIG. 2 is a perspective exploded view of the electronic device according to an embodiment of the disclosure.
Figure 3:
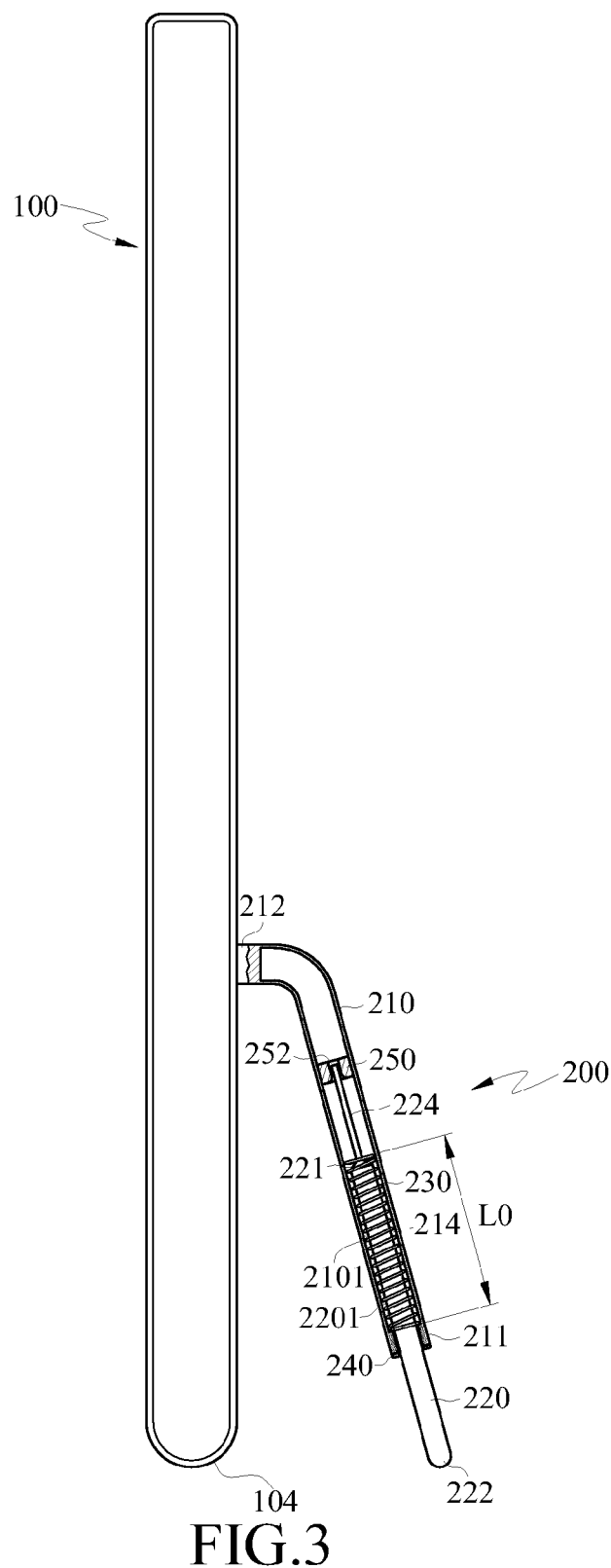
FIG. 3 is a side view of the electronic device according to an embodiment of the disclosure.

FIGS. 1 to 3 are a perspective view, a perspective exploded view and a side view of an electronic device of an embodiment of the disclosure respectively.

An electronic device 10 of the embodiment comprises a main body 100 and a stand structure 200. The main body 100 is capable of being a monitor, for example the main body 100 can be a plasma display panel, a liquid crystal display or a tablet computer. The stand structure 200 is disposed on the main body 100 for supporting the main body 100, so that the main body 100 is capable of being maintained at an expected tilted angle on a bearing surface.

In this embodiment, the stand structure 200 comprises a principal member 210, a supporting member 220 and an elastic member 230. The principal member 210 has a connecting terminal 212 which is connected to a side of the main body 100. The supporting member 220 is disposed in the principal member 210 and is configured to move relative to the principal member 210. The supporting member 220 has a withstanding terminal 222 which is disposed away from the principal member 210, for pressing against a bearing surface. Two opposite terminals of the elastic member 230 are fixed at the principal member 210 and the supporting member 220 respectively. The supporting member 220 can be moved relative to the principal member 210 to force the elastic member 230 to have an elastic deformation.

More specifically, in this embodiment or other embodiments, the principal member 210 a long tube with a chute 214 disposed inside. The principal member 210 further comprises a chute terminal 211, and the chute terminal 211 and the connecting terminal 212 are the two opposite terminals of the principal member 210. The chute 214 extends from the chute terminal 211 towards the connecting terminal 212. Furthermore, the supporting member 220 is a long rod and has a sliding terminal 221, and the sliding terminal 221 and the withstanding terminal 222 are the two opposite terminals of the supporting member 220. A part of the supporting member 220 is disposed in the chute 214. The supporting member 220 is configured to move relative to the chute 214. More specifically, the sliding terminal 221 of the supporting member 220 is disposed in the chute 214; the withstanding terminal 222 of the supporting member 220 is protruded outside the chute 214 and the withstanding terminal 222 is kept away from the chute terminal 211 at a distance.

Furthermore, the elastic member 230 of this embodiment is a tension spring and is disposed in the chute 214. The elastic member 230 is enclosed around the supporting member 220 so that it is disposed between an inner wall 2101 of the chute 214 and an outer surface 2201 of the supporting member 220. In other words, the supporting member 220 is not in direct rubbing and contact with the principal member 210. A terminal of the elastic member 230 is fixed at the chute terminal 211 of the principal member 210, and another terminal of the elastic member 230 is fixed at the sliding terminal 221 of the supporting member 220. When the elastic member 230 is not compressed and deformed elastically, it has an initial length L0. It should be noted that, the elastic member 230 of this embodiment is a tension spring as an example, but the disclosure is limited by the embodiment. For example, the elastic member 230 also is a compression spring if the connecting positions of the elastic member 230 with the supporting member 220 and the principal member 210 are changed appropriately.

Figure 4:
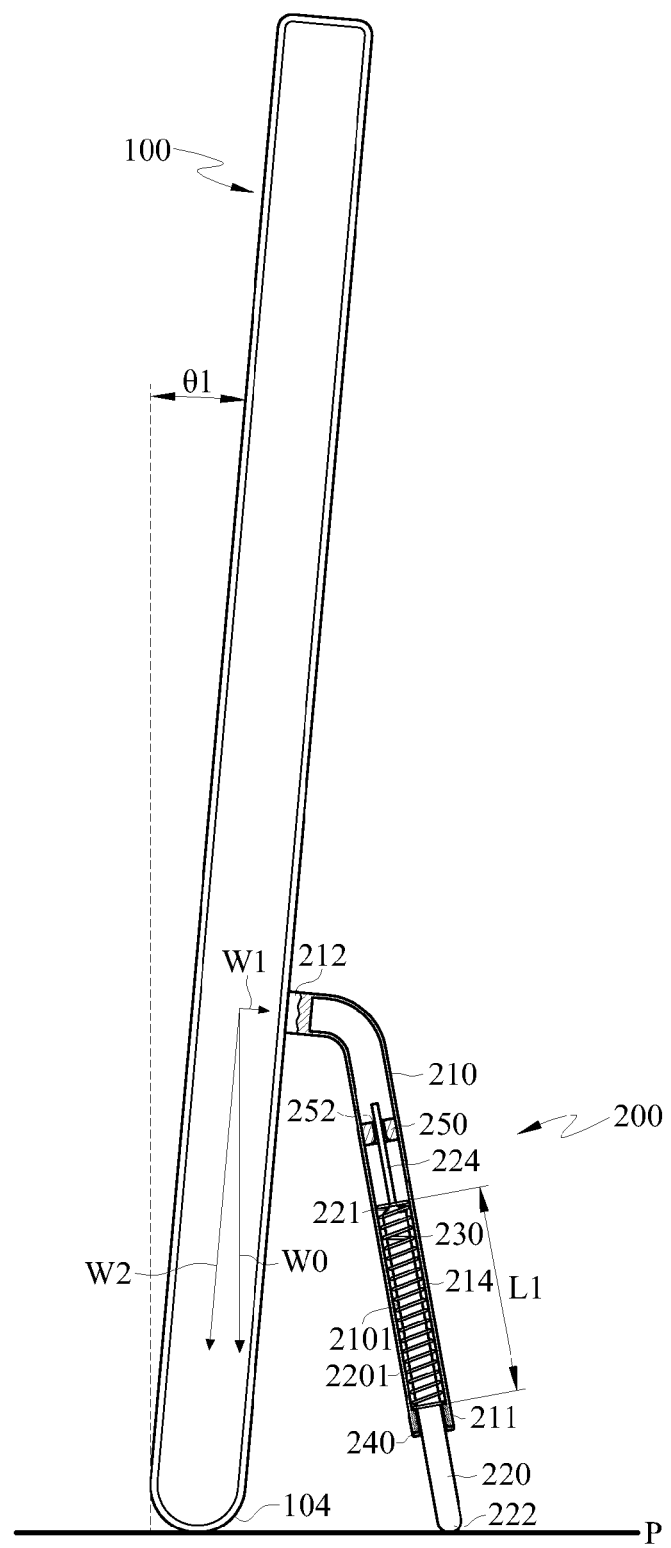
FIG. 4 is a side view of the electronic device according to an embodiment of the disclosure at a first tilted angle.
Figure 5:
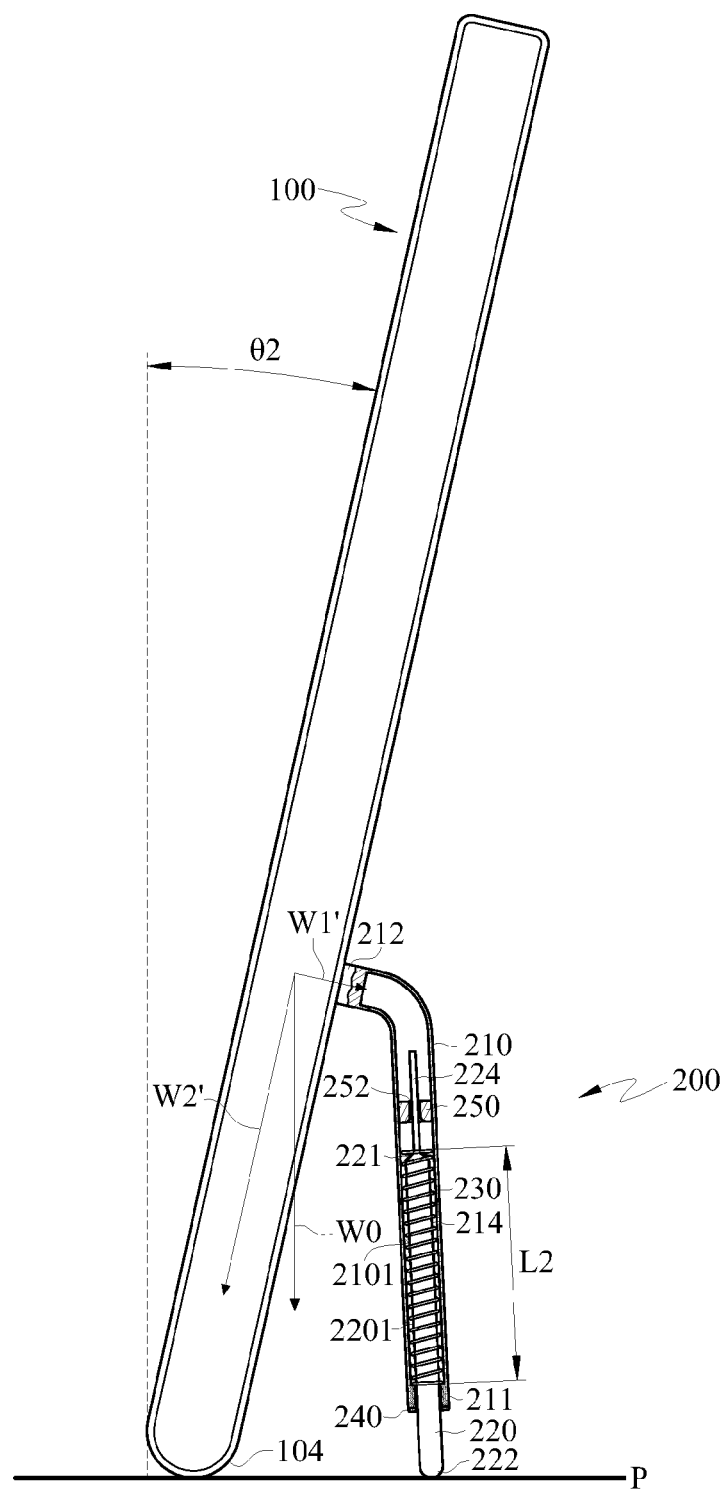
FIG. 5 is a side view of the electronic device according to an embodiment of the disclosure at a second tilted angle.

FIG. 4 is a side view of the electronic device having a first titled angle of an embodiment in the disclosure; and FIG. 5 is a side view of the electronic device having a second title angle of an embodiment in the disclosure. The following descriptions should be read in conjunction with FIGS. 3~5.

When the electronic device 10 is disposed on a bearing surface P, a bottom edge 104 of the main body 100 and the withstanding terminal 222 of the supporting member 220 are in contact with the bearing surface P, so that the main body 100 of the electronic device 10 is placed uprightly on the bearing surface P. When main body 100 is tilted at a first tilted angle θ1 relative to the bearing surface P, the weight W0 of the main body 100 is divided into orthogonal components of force W1 and W2. The component of force W2 is exerted at the bottom edge 102 of the main body 100 and the component of force W1 is exerted at the stand structure 200. Therefore, when the component of force W1 is exerted at the stand structure 200, the length of the supporting member 220 retracted into the principal member 210 is increased. Thereby, the withstanding terminal 222 is moved towards the chute terminal 211 and the sliding terminal 221 is moved further away from the chute terminal 211, so that the elastic member 230 is stretched with a first length L1 longer than the initial length L0. At this point, an opposite supporting force F1 generated by the elastic member 230 because of elastic deformation is equal to the component of force W1, and therefore the main body 100 can be maintained at the first tilted angle θ1.

When main body 100 is further pushed by the user, the main body 100 is tilted clockwise at a second tilted angle θ2 larger than the first tilted angle θ1 with the bottom edge 104 as a fulcrum, and a component of force W1' exerted at the stand structure 200 is also increased relatively. At this point, the length of the supporting member 220 retracted into the principal member 210 is further increased and the sliding terminal 221 is moved further away from the chute terminal 211, so that the elastic member 230 is stretched with a second length L2 longer than the first length L1. At this point, an opposite supporting force F2 generated by the elastic member 230 because of elastic deformation is equal to the component of force W1', and therefore the main body 100 can be maintained at the second tilted angle θ2.

Therefore, when the component of force exerted at the stand structure 200 is increased because of the increased tilted angle of the main body 100, the stretched length of the elastic member 230 is also increased. As a result, the supporting force generated by the elastic member 230 because of elastic deformation is increased in order to withstand the increased component of force, so that the main body 100 can be maintained at the tilted angle.

Furthermore, if the elasticity of coefficient of the elastic member 230 is chosen appropriately, the tilted angle of the main body 100 can be changed accordingly, and therefore the main body 100 can be maintained at the tilted angle by employing the stand structure 200 of this embodiment. As a result, a stepless adjusting mechanism is achieved.

Please refer to FIG. 2, in this embodiment or other embodiments, the connecting terminal 212 of the principal member 210 in the stand structure 200 can further comprise a coupling member 216, and a coupling groove 102 can be further disposed on the side of the main body 100. The coupling member 216 can be coupled with the coupling groove 102, so that the stand structure 200 can be disposed on the main body 100 detachably.

Please refer to FIG. 3, in this embodiment or other embodiments, the stand structure 200 can further comprise an adjusting member 240. The adjusting member 240 can be a screw cap. The adjusting member 240 is screwed at the chute terminal 211 of the principal member 210. A terminal of the elastic member 230 is connected to the adjusting member 240, so that the terminal of the elastic member is fixed at the chute terminal 211 through the adjusting member 240. The length of the elastic member 230 can be changed by adjusting a number of turns of the adjusting member 240 screwed with the chute terminal 211, and therefore the initial length of the elastic member 230 can be adjusted.

Furthermore, in this embodiment or other embodiments, a guiding structure 250 can be further disposed in the chute 214 of the principal member 210. The guiding structure 250 has a guiding groove 252. The sliding terminal 221 of the supporting member 220 can further comprise a guiding rod 224 which is disposed in the guiding groove 252. By the design of the guiding groove 252 and the guiding rod 224, the supporting member 220 is configured to slide smoothly in the chute 214, and the problems of skew and interference can therefore be prevented from happening.

Figure 6:
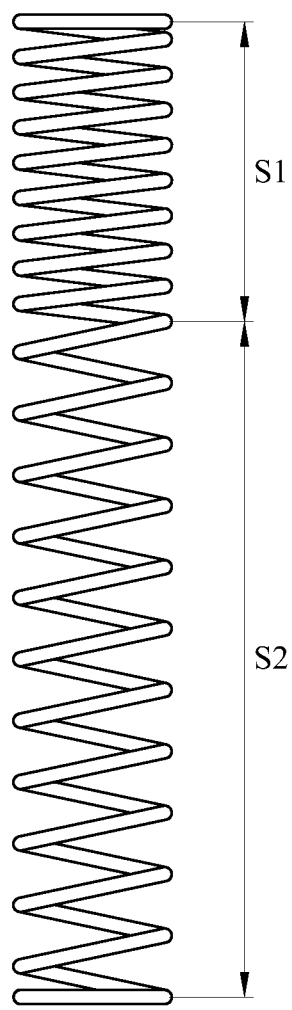
FIG. 6 is a perspective view of an elastic member according to an embodiment of the disclosure.

FIG. 6 is a structural view of the elastic member according to an embodiment of the disclosure. In this embodiment or other embodiments, two different sections of the elastic member 230 have different coefficients of elasticity so as to allow the elastic member 230 to have a better equivalent coefficient of elasticity. More specifically, according to the embodiment shown in FIG. 6, the elastic member 230 is a spring having a first section S1 and a second section S2. A density of coils of the first section S1 is different from a density of coils of the second section S2. Therefore, the first section S1 and the second section S2 of the elastic member 230 have different elasticity coefficients. It should be noted that, the characteristic of the different coefficients of elasticity of the two different sections of the elastic member 230 should not be construed as a limitation to the disclosure. In other embodiments, all the sections of the elastic member 230 can have the same elasticity coefficient.

According to the structure disclosed in the above embodiments, the tilted angle of the main body (the display) can be adjusted freely according to the requirement by the user, and the main body can be adjusted and tilted at an expected angle by touching the main body rather than the stand structure. Furthermore, the tilted angle of the main body can be adjusted by simply exerting a small force (approximate within 1 kilogram) on the main body which is convenient and easy for users of any age.

Additionally, the stand structure is a tube structure and therefore it is compact and light. As a result, the packaging dimensions of the stand structure can be reduced and it is convenient for carrying around and storage.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A stand structure, comprising:
a principal member having a connecting terminal suitable for connecting with an object;
a supporting member movably connected with the principal member, the supporting member having a withstanding terminal suitable for leaning against a bearing surface; and
an elastic member, two opposite terminals of the elastic member being fixed at the principal member and the supporting member respectively,
wherein the supporting member and the elastic member are aligned along a supporting axis, and the supporting axis forms an acute angle with the bearing surface; and
wherein, when the object is tilted at a tilt angle relative to the bearing surface, the supporting member is retracted and displaced relative to the principal member, and therefore the elastic member is elastically deformed to generate an opposite supporting force to withstand the object so that the tilt angle of the object can be maintained.

2. The stand structure as claimed in claim 1, wherein the principal member has a chute, a part of the supporting member is disposed in the chute, and the withstanding terminal protrudes from the chute.

3. The stand structure as claimed in claim 2, wherein the elastic member is disposed in the chute and encloses the supporting member, and thereby the elastic member is disposed between an inner wall of the chute and an outer surface of the supporting member.

4. The stand structure as claimed in claim 2, wherein there is a guiding structure in the chute, the guiding structure has a guiding groove, the supporting member has a guiding rod at a terminal away from the withstanding terminal, and the guiding rod is disposed in the guiding groove.

5. The stand structure as claimed in claim 1, further comprising an adjusting member disposed in the principal member and connected to the elastic member for changing the length of the elastic member, so as to adjust the elasticity coefficient of the elastic member.

6. The stand structure as claimed in claim 1, wherein the elastic member is a tension spring.

7. The stand structure as claimed in claim 1, wherein two different sections of the elastic member have different elasticity coefficients.

8. An electronic device, comprising:
a main body; and
a stand structure, comprising:
a principal member having a connecting terminal for connecting a side of the main body;
a supporting member movably connected with the principal member, wherein the supporting member has a withstanding terminal for leaning against a bearing surface; and
an elastic member, two opposite terminals of the elastic member being fixed at the principal member and the supporting member respectively,
wherein the supporting member and the elastic member are aligned along a supporting axis, and the supporting axis forms an acute angle with the bearing surface; and
wherein, when the main body is tilted at a tilt angle relative to the bearing surface, the supporting member is retracted and displaced relative to the principal member, and therefore the elastic member is elastically deformed to generate an opposite supporting force to withstand the main body so that the tilt angle of the main body can be maintained.

9. The electronic device as claimed in claim 8, wherein the principal member of the stand structure has a chute, a part of the supporting member is disposed in the chute, and the withstanding terminal protrudes from the chute.

10. The electronic device as claimed in claim 9, wherein the elastic member is disposed in the chute and encloses the supporting member, and thereby the elastic member is disposed between an inner wall of the chute and an outer surface of the supporting member.

11. The electronic device as claimed in claim 9, wherein a guiding structure is disposed in the chute, the guiding structure has a guiding groove, the supporting member has a guiding rod at a terminal away from the withstanding terminal, and the guiding rod is disposed in the guiding groove.

12. The electronic device as claimed in claim 8, wherein the stand structure further comprises an adjusting member disposed in the principal member and connected to the elastic member for changing the length of the elastic member, so as to adjust the elasticity coefficient of the elastic member.

13. The electronic device as claimed in claim 8, wherein the elastic member is a tension spring.

14. The electronic device as claimed in claim 8, wherein two different sections of the elastic member have different elasticity coefficients.

15. The electronic device as claimed in claim 8, wherein the main body comprises a monitor.

16. The stand structure as claimed in claim 1, wherein one end of the elastic member is fixed at the top end of the supporting member, and the other end of the elastic member is fixed at the lower end of the principle member.

17. The electronic device as claimed in claim 8, wherein one end of the elastic member is fixed at the top end of the supporting member, and the other end of the elastic member is fixed at the lower end of the principle member.

18. The electronic device as claimed in claim 8, wherein the stand structure is located outside the electronic device and connected with the electronic device only by the connecting terminal of the principle member.

\* \* \* \* \*